---

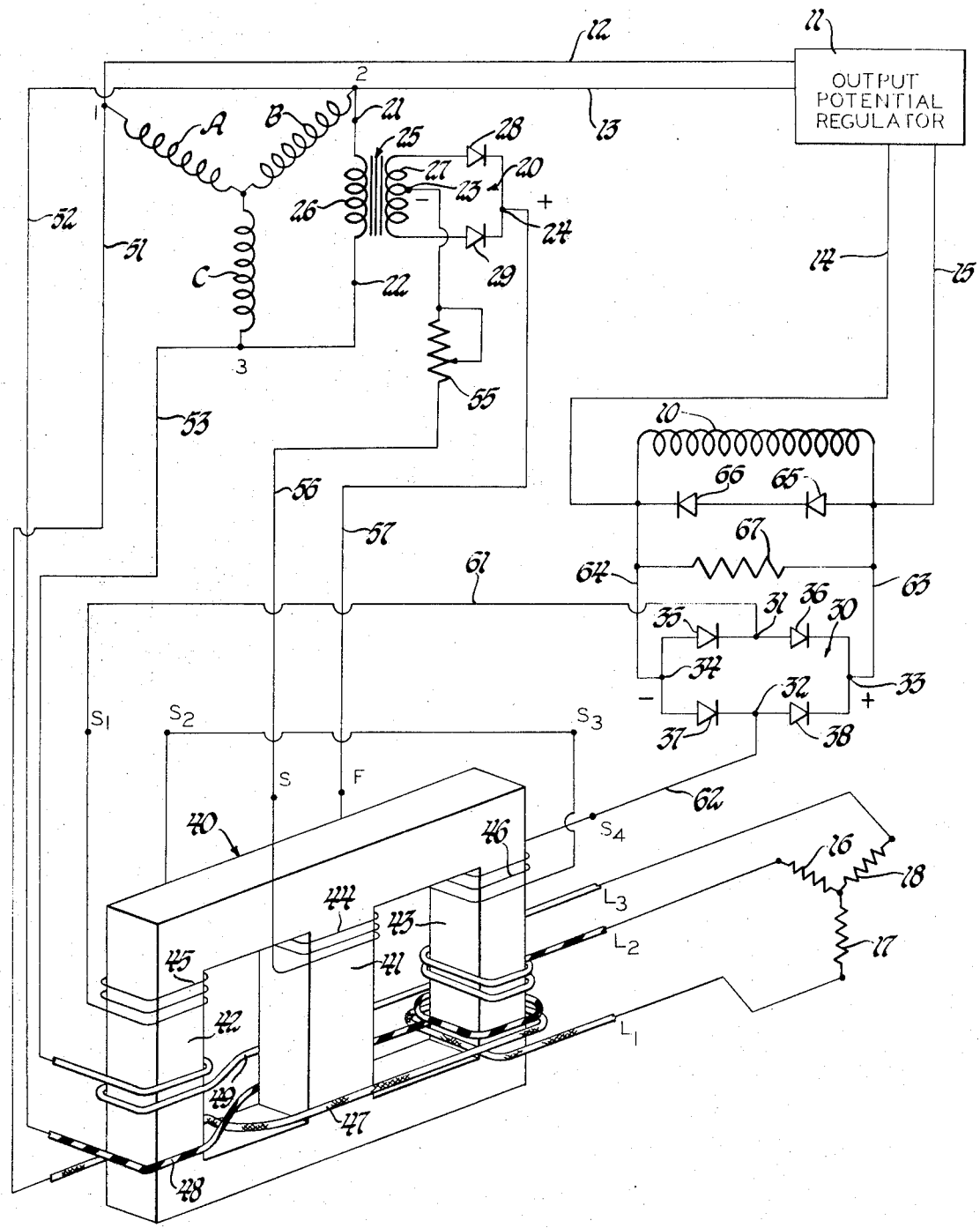

United States Patent Office 3,548,258
Patented Dec. 15, 1970

---

3,548,258
ALTERNATING CURRENT ALTERNATOR PROTECTOR SYSTEM
Dennis J. Ricker, Dayton, Ohio, assignor to General Motors Corporation, Detroit, Mich., a corporation of Delaware
Filed Jan. 28, 1969, Ser. No. 794,601
Int. Cl. H02h 7/06
U.S. Cl. 317—13                        4 Claims

---

ABSTRACT OF THE DISCLOSURE

An alternating current alternator protector system utilizing a current type transformer having a closed magnetic circuit comprised of a center leg disposed between two outer legs. The output leads from the alternator are wound about the two outer legs in a manner to prevent the flow of magnetic flux in the center leg. One phase of the generated potential is rectified and applied across a saturating coil which is wound upon the center leg to normally saturate the magnetic circuit iron. With short circuit or extreme overload conditions, the magnitude of the alternator output potential reduces, consequently, the amount of current flow through the saturating coil also reduces. This reduced saturating coil current no longer produces sufficient flux to saturate the current transformer magnetic circuit, consequently, the resulting potential induced in a secondary winding having a coil wound upon each outer leg is rectified and applied across the exciter field winding to produce sufficient excitation current therethrough to increase the alternator output potential to a magnitude which will operate an associated circuit protective device.

---

This invention relates to alternating current alternator protector systems, and, more specifically, to a system of this type which employs a current type transformer.

With alternator protector system which use a standard or conventional current transformer it is necessary that the current transformer be of limited strength as the output potential thereof may be of a magnitude which produces more than the required alternator field exciter current for a given load. This oversupply of exciter field current overrides the potential regulator which results in an increase of line potential above the desired maximum.

It is desirable that the current transformer be of sufficient strength to provide exciter field excitation current with either three phase or single phase short circuit conditions of sufficient magnitude to produce an alternator output current which will operate an associated circuit protective device without producing an oversupply of exciter field current under normal alternator load conditions.

It is, therefore, an object of this invention to provide an improved alternator protector system.

It is another object of this invention to provide an improved alternator protector system employing a current type transformer which will produce alternator exciter field energizing current with short circuit conditions without producing an oversupply of alternator exciter field energizing current with normal load conditions.

In accordance with this invention, an improved alternator protector system is provided wherein the output lines from the alternator are wound upon two outside legs of a closed magnetic circuit of a current type transformer in a direction which will prevent the flow of flux through a center leg of the magnetic circuit, a secondary winding coil is wound upon each outside leg and a saturating coil energized by a rectified output phase is wound upon the center leg whereby, with normal load conditions, the saturating coil is energized sufficiently to saturate the iron of the magnetic circuit to prevent secondary winding output and with abnormal load conditions, the saturating coil energizing current is reduced to permit the transformer iron to go out of saturation thereby permitting a greater potential to be induced in the secondary winding which is rectified and applied across the exciter field winding.

For a better understanding of the present invention, together with additional objects, advantages and features thereof, reference is made to the following description and accompanying single figure drawing which sets forth the alternator protector system of this invention in schematic form.

Referring to the figure, the alternating current alternator protector system of this invention for use with a three phase alternator supplying an external three phase electrical load and having an alternating current output winding corresponding to each phase of the generated potential referenced as coils A, B and C, and an exciter field winding 10 is set forth in schematic form. The system includes a first rectifier circuit 20 having alternating current input circuitry suitable for effecting an electrical connection across a selected one phase of the associated alternator and direct current output circuitry also suitable for effecting an external electrical connection for rectifying the output potential of the selected phase, a second rectifier circuit 30 having alternating current input circuitry suitable for effecting an electrical connection to external circuitry and direct current output circuitry also suitable for effecting an electrical connection to respective terminal ends of the exciter field winding 10 of the associated alternator, a current transformer 40 having a closed magnetic circuit comprised of a center leg 41 disposed between first and second outer legs, 42 and 43, a saturating coil 44 wound upon the center leg, a secondary winding having a coil 45 and 46 thereof wound upon each of the two outer legs and the terminal ends thereof connected across the alternating current input circuitry of the second rectifier circuit 30 and the supply lines extending between each output winding of the associated alternator and the supplied three phase load magnetically coupled to the magnetic circuit of the current transformer in a manner which will prevent the flow of magnetic flux through the center leg thereof.

A conventional output potential regulator 11, shown in the figure in block form as it may be of conventional design and forms no part of this invention, has the input circuitry thereof connected across alternator output windings A and B through leads 12 and 13 and supplies the proper energizing current for exciter field winding 10 through leads 14 and 15.

The alternator may supply an external three phase electrical load, set forth in the figure as Y connected resistors 16, 17 and 18 through supply lines 51, 52 and 53. While the external load is shown to be resistive it is to be specifically understood that any type external electrical load may be employed without departing from the spirit of this invention.

Supply lines 51, 52 and 53 extending between each output winding A, B and C, respectively, of the associated alternator and the supplied three phase load, Y connected resistors 16, 17 and 18 are magnetically coupled to the magnetic circuit of current transformer 40 in a manner which will prevent the flow of magnetic flux through the center leg thereof. This magnetic coupling may be accomplished in either of two ways. The current transformer may be provided with first, second and third primary windings 47, 48 and 49 through which the output windings of the associated alternator may be connected to the external electrical load with the first primary winding 47 having a coil thereof wound upon each the first and second outer legs 42 and 43 of current transformer 40 in a first direction and in a second opposite direction, respectively, and the second and third primary windings 48 and 49 each having a coil thereof wound upon the first and second outer legs 42 and 43 in a direction opposite to that of the first primary winding 47 with a selected one of the second and third primary windings 48 and 49 having twice as many turns on each of outer legs 42 and 43 as the other two primary windings. Alternatively, the supply lines may be threaded through the current transformer magnetic circuit in a similar manner.

In the figure, primary winding 47 is wound with a single turn in a clock-wise direction about the outer leg 42 and a single turn in a counter clock-wise direction around outer leg 43, primary winding 48 is wound with a single turn in a counter clock-wise direction about outer leg 42 and a single turn in a clock-wise direction about outer leg 43 and primary winding 49 is wound with two turns in a counter clock-wise direction about outer leg 42 and two turns in a clock-wise direction about outer leg 43.

The primary winding having twice as many turns as the other two is determined by the connection of output regulator 11, which, in the figure, is connected across lines 51 and 52 which, in turn, are connected to primary windings 47 and 48, the single turn primary windings. In the event the alternative of threading the supply lines through the current transformer magnetic circuit is elected, these lines are threaded through in a similar manner. As coils 47, 48 and 49 are wound in opposite directions about the respective outer legs, there is little or no magnetic flux through center leg 41.

The first full-wave rectifier circuit 20, having alternating current input circuitry suitable for effecting an electrical connection to external circuitry, which may be terminals 21 and 22, direct current output circuitry suitable for effecting an electrical connection to external circuitry, which may be terminals 23 and 24, a transformer 25 having a primary winding 26 and a center tapped secondary winding 27 and two diodes 28 and 29, is provided for rectifying the output potential of a selected one phase of the alternator output potential.

Alternating current input terminals 21 and 22 of rectifier circuit 20 are connected across alternator output windings A and B, as indicated, and, to apply the resulting rectified potential across saturating coil 44, direct current output circuit terminals 23 and 24 are connected across the terminal ends of saturating coil 44 through potentiometer 55 and lead 56 and lead 57, respectively. Potentiometer 55 may be included in this circuit for the purpose of adjusting the strength of the magnetic field of saturating coil 44 by adjusting the magnitude of direct current energizing current flow therethrough.

The second rectifier circuit 30, having alternating current input circuitry suitable for effecting an electrical connection to external circuitry which may be terminals 31 and 32, direct current output circuitry suitable for effecting an electrical connection to external circuitry, which may be terminals 33 and 34, and four diodes 35, 36, 37 and 38, is provided for rectifying any potential which may be induced in coils 45 and 46 of the secondary winding, the terminal ends of which are connected across alternating current input terminals 31 and 32 of rectifier 30 through leads 61 and 62.

To apply the rectified potential of the secondary winding across exciter field winding 10, the terminal ends of exciter field winding 10 are connected across the direct current output circuit terminals 33 and 34 of rectifier circuit 30 through respective leads 63 and 64.

In the event of a short circuit or a heavy overload, the magnitude of the potential across the output circuit terminals of the alternator falls to a low value which may not be of sufficient magnitude to provide an exciter field winding energizing current of sufficient magnitude to maintain the alternator output potential at a level which will operate an associated disconnect circuit breaker or other similar circuit protective device. In this regard, it is desirable that the alternator provide greater than three per unit drive under all short circuit conditions which is three times the rated line current of the alternator.

With normal load conditions and rated potential, appearing across the alternator output winding output terminals, potentiometer 55 is adjusted to produce sufficient energizing current flow through saturating coil 44 to maintain the iron of the magnetic circuit of current type transformer 40 in saturation until the generated output potential has reduced to a predetermined value, usually about 25% of rated value. With the magnetic circuit iron in saturation by the flux produced by the flow of energizing current through saturating coil 44, the pulsating load current flow through supply lines 51, 52 and 53 or primary windings 47, 48 and 49 is ineffective to produce a pulsating magnetic flux in the current transformer 40 magnetic circuit, consequently, there is substantially no potential induced in coils 45 and 46 of the secondary winding. Therefore, with normal load conditions, the system of this invention is ineffective to provide energizing current for exciter winding 10 and, consequently, does not override or interfere with the operation of potential regulator 11.

With short circuit or overload conditions, the generated output potential falls to a low value of insufficient magnitude to provide proper energizing current for exciter field winding 10 through output potential regulator 11, consequently, the potential regulator loses control and the generated potential remains at a low value which is of insufficient magnitude to operate an associated circuit protective device.

Under short circuit or overload conditions with the protector system of this invention, when the output potential across coils A and B falls to a low value, the direct current output potential of rectifier circuit 20, which produces the energizing current for saturating coil 44, also reduces in magnitude, a condition which reduces the magnitude of energizing current flow through saturating coil 44. The resulting reduced ampere turns produce a weakened magnetic field which permits the magnetic circuit of the current transformer 40 to go out of saturation.

With the magnetic circuit of current transformer 40 out of saturation, the load current flow through supply lines 51, 52 and 53 on primary windings 47, 48 and 49 produces a pulsating magnetic flux through the magnetic circuit of current transformer 40 which induces a potential in coils 45 and 46 of the secondary winding. This potential induced in coils 45 and 46 of the secondary winding is rectified by rectifier circuit 30 and appears as a direct current potential across output circuit terminals 33 and 34 thereof which is applied across exciter field winding 10. With exciter field winding 10 being energized by a source other than by output potential regulator 11, the alternator continues to generate a potential of sufficient magnitude to operate the associated disconnect circuit breaker or other similar circuit protective device to remove the short circuit or overload condition from the alternator output.

Diodes 65 and 66 are freewheeling diodes which provide for the circulation of current upon the collapse of the magnetic field produced by current flow through exciter winding 10 and resistor 67 is a surge resistor which reduces the potential across the rectifier bridge 30 to a safe value.

What is claimed is:

1. An alternating current alternator protector system for use with a three phase alternator supplying an external three phase electrical load having an alternating current output winding corresponding to each phase of the generated potential and an exciter field winding comprising, a first rectifier circuit having alternating current input circuit means suitable for effecting an electrical connection across a selected one phase of an associated alternator and direct current output circuit means for rectifying the output potential of said selected phase, a second rectifier circuit having alternating current input circuit means suitable for effecting an electrical connection to external circuitry and direct current output circuit means suitable for effecting an electrical connection to respective terminal ends of the exciter field winding of an associated alternator, a current transformer having a closed magnetic circuit comprised of a center leg disposed between first and second outer legs, a saturating coil wound upon said center leg having the terminal ends thereof connected across said direct current output circuit means of said first rectifier circuit, a secondary winding coil having a coil thereof wound upon each of said first and second outer legs and the terminal ends thereof connected across said alternating current input circuit means of said second rectifier circuit and means for magnetically coupling the supply lines extending between each output winding of the associated alternator and the supplied three phase load to said magnetic circuit of said current transformer in a manner which will prevent the flow of magnetic flux through said center leg thereof.

2. An alternating current alternator protector system for use with a three phase alternator having an alternating current output winding corresponding to each phase of the generated potential and an exciter field winding comprising a first rectifier circuit having alternating current input circuit means suitable for effecting an electrical connection across a selected one phase of an associated alternator and direct current output circuit means for rectifying the output potential of said selected phase, a second rectifier circuit having alternating current input circuit means suitable for effecting an electric connection to external circuitry and direct current output circuit means suitable for effecting an electrical connection to respective terminal ends of the exciter field winding of an associated alternator, a current transformer having a closed magnetic circuit comprised of a center leg disposed between first and second outer legs, a saturating coil wound upon said center leg having the terminal ends thereof connected across said direct current output circuit means of said first rectifier circuit, a secondary winding having a coil thereof wound upon each of said first and second outer legs and the terminal ends thereof connected across said alternating current input circuit means of said second rectifier circuit and first, second and third primary windings through which the output windings of an associated alternator may be connected to an external electrical load, said first primary winding having a coil thereof wound upon each said first and second outer legs in a first direction and in a second opposite direction, respectively, and said second and a third primary winding each having a coil thereof wound upon said first and second outer legs in directions opposite to that of said first primary winding with a selected one of said second and third primary windings having twice as many turns on each said outer leg as the other two said primary windings.

3. An alternating current alternator protector system comprising in combination with a three phase alternator having an alternating current output winding corresponding to each phase of the generated potential terminating in an electrical output circuit device suitable for effecting an electrical connection to external circuitry and an exciter field winding and a three phase electrical load, a current transformer having a closed magnetic circuit comprised of a center leg disposed between first and second outer legs, a saturating coil wound upon said center leg, a secondary winding having a coil thereof wound upon each of said first and second outer legs, a first primary winding having a coil thereof wound upon each said first and second outer legs in a first direction and in a second opposite direction, respectively, a second and a third primary winding each having a coil thereof wound upon said first and second outer legs in directions opposite to that of said first primary winding with a selected one of said second and third primary windings having twice as many turns on each said outer leg as the other two said primary windings, means for rectifying the output potential of a selected phase of said alternator and applying said rectified potential across said saturating coil, means for connecting a terminal end of each of said primary windings to a selected one of said electric output circuit devices and the other terminal end of each of said primary windings to said electrical load, means for rectifying any potential induced in said secondary winding and means for applying the rectified potential of said secondary winding across said exciter field winding.

4. An alternating current alternator protector system comprising in combination with a three phase alternator having an alternating current output winding corresponding to each phase of the generated potential terminating in an electrical output circuit device suitable for effecting an electrical connection to external circuitry and an alternator exciter field winding, a current transformer having a closed magnetic circuit comprised of a center leg disposed between first and second outer legs, a saturating coil wound upon said center leg, a secondary winding having a coil thereof wound upon each of said first and second outer legs, a first rectifier circuit having alternating current input circuit means and direct current output circuit means for rectifying the output potential of a selected phase of said alternator, means for connecting a selected two of said electrical output circuit devices across said alternating current input circuit means of said first rectifier circuit, means for connecting said saturating coil across said direct current output circuit means of said first rectifier circuit, a second rectifier circuit having alternating current input circuit means and direct current output circuit means, means for connecting said secondary winding across said alterating curret input circuit means of said second rectifier circuit, means for connecting said exciter field winding across said direct current output circuit means of said second rectifier circuit, a first output circuit line extending from a selected one of said electrical output circuit devices and wound upon said first and second outer legs of said magnetic circuit of said current transformer in a first direction and in a second opposite direction, respectively, a second and a third output circuit line extending from each other one of said electrical output circuit devices and wound upon said first and second outer legs of said magnetic circuit of said current transformer in directions opposite to that of said first output circuit line with a selected one of said second and third output circuit lines having twice as many turns on each said outer leg as the other two said primary windings.

References Cited
UNITED STATES PATENTS 2,523,117  9/1950  Jennings _____ 317—13X
2,862,173  11/1958  Bobo et al. _____ 322—25
2,995,684  8/1961  Fleming _____ 317—13X ORIS L. RADER, Primary Examiner H. HUBERFELD, Assistant Examiner U.S. Cl. X.R.

317—31; 322—25, 27